Sept. 9, 1969     W. R. SPENCER     3,466,070
CONDUIT FLANGES
Filed May 2, 1966
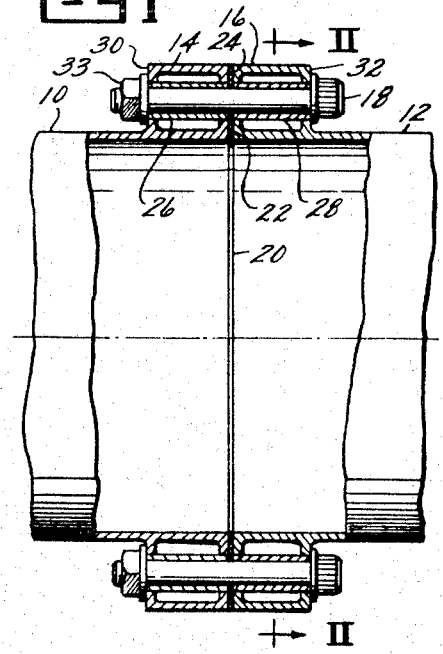
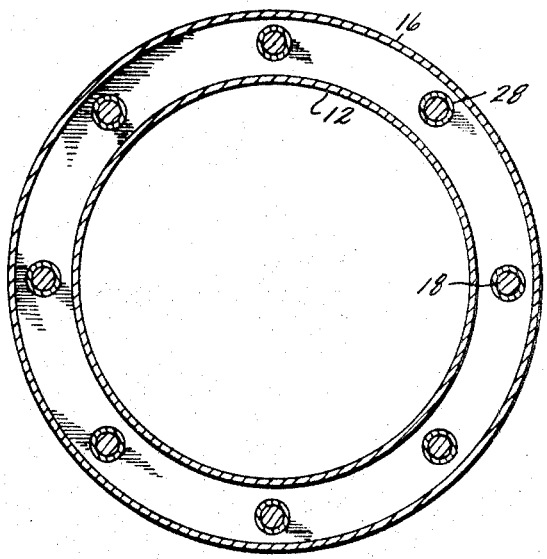
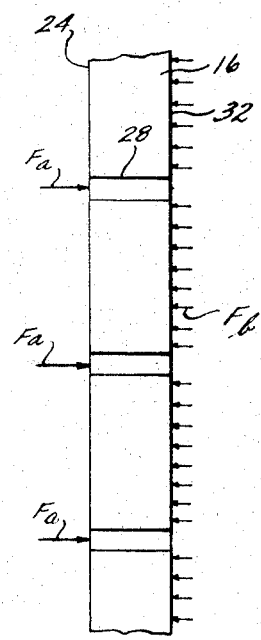
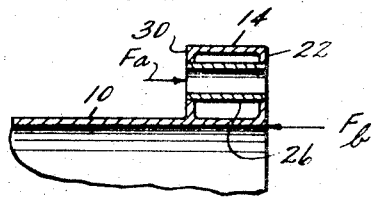
INVENTOR.
WILLIAM R. SPENCER
BY

United States Patent Office 3,466,070
Patented Sept. 9, 1969

3,466,070
CONDUIT FLANGES
William R. Spencer, Cincinnati, Ohio, assignor to General Electric Company, a corporation of New York
Filed May 2, 1966, Ser. No. 546,754
Int. Cl. F16l 23/00, 19/02
U.S. Cl. 285—405    3 Claims

ABSTRACT OF THE DISCLOSURE

A conduit connection comprises hollow flanges having interconnecting tubes. Radial walls of the flanges are held in tight sealing engagement by bolts extending through the tubes.

---

The invention described and claimed in the United States patent application herein resulted from work done under United States Government contract FA-SS-66-6. The United States Government has an irrevocable, non-exclusive license under said application to practice and have practiced the invention claimed herein, including the unlimited right to sublicense others to practice and have practiced the claimed invention for any purpose whatsoever.

The present invention relates to conduit flanges and more particularly to flanges used in the mounting of a conduit.

It is a common practice to mount a conduit to another member by means of a flange which is attached to the end of the conduit and suitably clamped to the member. In many cases when a conduit is pressurized, a seal or gasket is clamped between the flange and the member to prevent leakage therethrough.

The use of a seal requires that the deflection of the flange in response to the normal anticipated loads thereon be within that required by the seal for effective functioning. The deflection limits required by a metal seal, used in high temperature applications, are exceedingly small and necessitate the use of an extremely rigid flange.

It is normal practice to enlarge the physical dimensions of a flange to maintain its deflection such that a seal, such as a metal type, will function properly.

However, the weight added in extra flange material is substantial and in some cases where light weight is required may be a severe penalty.

Accordingly, it is an object of the present invention to provide a rigid conduit flange of light weight and to do so in a simplified, economical fashion.

The above ends are achieved in a broad sense by providing a first member having a flange for engaging another member to which the first member is to be attached. The flange is characterized in that it is of hollow cross section and has a radial wall extending from the outer end of the first member for sealing engagement with the member to which the first member is to be attached. The radial sealing wall is thereby extremely rigid and hence effective in maintaining a seal when the flange is subjected to bending and torsional forces resulting from internal pressurization of the first member.

In a preferred form of the invention, the flange has a square cross section for an optimum rigidity to weight ratio.

The above and other related objects and features of the invention will be apparent from a reading of the following description of the disclosure found in the accompanying drawings and the novelty thereof pointed out in the appended claims.

In the drawings:

FIGURE 1 is a longitudinal section of a conduit having a flange embodying the present invention;

FIGURE 2 is a view taken on line II—II of FIGURE 1;

FIGURE 3 is a development view of the flange shown in FIGURE 1 showing typical loads thereon; and FIGURE 4 is a fragmentary view of the flange shown in FIGURE 1 showing typical loads thereon.

FIGURE 1 shows a pair of conduits 10, 12 having annular flanges 14, 16 respectively. A seal 20 is clamped between these flanges by means of a plurality of circumferentially spaced bolts 18 which pass through the flanges.

As shown in FIGURES 1 and 2, the flanges 14, 16 are of rectangular, hollow cross section with the inner walls of these flanges being formed integrally with the conduits 10, 12 respectively. Alternatively the flanges 14, 16 could be formed from U-shaped rings secured to the conduits 10, 12 or annular rings of hollow rectangular cross section separately fabricated and secured, as by welding, to the conduits 10, 12.

A series of circumferentally spaced tubes 26, 28 pass through the flanges 14, 16. The tubes 26 are secured, as by brazing, to the radial walls 22, 30 of flange 14 while the tubes 28 are similarly secured to the radial walls 24, 32 of flange 16. The bolts 18 pass through the tubes 26, 28 and clamp the seal 20 between the flanges 14, 16 with a desired preload by tightening nuts 33.

The bolts 18 exert a compressive force on the flanges 14 and 16 which is effectively carried by the tubes 26, 28. This arrangement permits significantly high preload forces to be applied by the bolts 18 and transmitted to the radial walls 22, 24 without distortion or crushing of the walls of the flanges 14 and 16. Additionally, the tubes 26, 28 minimize the bending of the flanges 14, 16 at that point which greatly reduces the deflection intermediate the tubes 26, 28.

The stresses on the two flanges 14 and 16 are the same, so reference will be made to FIGURES 3 and 4 for a discussion of the force relationships relative to flange 14. FIGURE 3 is a development view illustrating that the flange 14 may be considered as a continuous beam fixed at tubes 26 by the bolts 18, as represented by the effective force vectors $F_a$. Internal pressurization of the conduit 10 results in a tension force which exerts a uniform loading on this beam indicated by arrows $F_b$. The box construction of the flange 14 provides for a minimum bending deflection intermediate the bolts 18 for a given weight. The bending rigidity and hence sealing effectiveness of the flange 14 may therefore be made significantly greater than a solid flange of equal weight.

Pressurization of the conduit 10 also causes a twisting moment to be exerted on the flange 10, as indicated in FIGURE 4, wherein it is seen that the force vectors $F_a$ and $F_b$ are offset. The rectangular cross section of the flange 14 is likewise highly effective in providing a high degree of rigidity for resisting this twisting moment. Again, for a given flange weight greater torsional rigidity may be obtained by the hollow construction than if a solid flange were used. By employing a square cross section, an optimum ratio of torsional rigidity to weight may be obtained.

The wall thickness of the hollow flange 14 in relation to its outside dimensions is selected to achieve the best rigidity to weight ratio for given materials and anticipated loads.

Having thus described the invention, what is claimed as novel and desired to be secured by Letters Patent of the United States is:

1. A first member having a flange for engaging another member to which the first member is to be attached, said flange being characterized in that it is of hollow box-like cross section and has a radial wall extending from the outer end of said first member for sealing engagement with the member to which the first member is to be attached, said flange having a second radial wall, and inner and outer walls secured to said radial walls, and a plurality of circumferentially spaced tubes spanning the radial walls of said flange, said tubes being secured to said radial walls to provide a passage and rigid support for clamping means which are employed in sealingly securing the flange to the member, whereby said flange may be sealingly secured by said clamping means with a substantial preload and said radial sealing wall is extremely rigid and hence effective in maintaining a seal when said flange is subjected to bending and torsional forces resulting from internal pressurization of said first member.

2. A member and flange as in claim 1 wherein, said first member is a conduit, and said flange is of rectangular cross section.

3. A conduit and flange as in claim 2 wherein, said flange has a square cross section for an optimum rigidity to weight ratio.

References Cited

UNITED STATES PATENTS

| 659,888 | 10/1900 | Dresser | 285—368 |
| 954,673 | 4/1910 | Felker | 285—405 |
| 2,309,967 | 2/1943 | Litton | 285—187 |
| 2,457,073 | 12/1948 | Stearns | 285—187 X |
| 2,816,780 | 12/1957 | Ross | 285—363 X |
| 2,998,962 | 9/1961 | Heyn | 285—187 X |

THOMAS F. CALLAGHAN, Primary Examiner